United States Patent
Goto et al.

(10) Patent No.: US 7,549,523 B2
(45) Date of Patent: Jun. 23, 2009

(54) FRICTION APPLY DEVICE OF AN AUTOMATIC TRANSMISSION

(75) Inventors: Shintaro Goto, Toyota (JP); Naoki Kato, Aichi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 398 days.

(21) Appl. No.: 11/481,831

(22) Filed: Jul. 7, 2006

(65) Prior Publication Data

US 2007/0032335 A1 Feb. 8, 2007

(30) Foreign Application Priority Data

Aug. 5, 2005 (JP) ............................. 2005-228691

(51) Int. Cl.
*F16D 25/10* (2006.01)
*F16D 25/0638* (2006.01)
*F16H 31/00* (2006.01)

(52) U.S. Cl. ................. 192/87.11; 192/87.15; 192/70.2; 475/146

(58) Field of Classification Search ............... 192/87.11, 192/87.15, 87.16; 475/146; 92/211, 213, 92/256

See application file for complete search history.

(56) References Cited

U.S. PATENT DOCUMENTS

| 2,879,872 | A | * | 3/1959 | Van Ranst | 192/104 R |
| 3,047,115 | A | * | 7/1962 | Lee et al. | 192/85 AA |
| 3,224,539 | A | * | 12/1965 | Hensel | 192/87.11 |
| 2007/0161450 | A1 | * | 7/2007 | Onishi et al. | 475/146 |

FOREIGN PATENT DOCUMENTS

JP          9-32919          2/1999

* cited by examiner

*Primary Examiner*—Rodney H Bonck
(74) *Attorney, Agent, or Firm*—Oblon, Spivak, McClelland, Maier & Neustadt, P.C.

(57) ABSTRACT

A second clutch piston formed of a plurality of members including a cylindrical cylinder member, a disc-shaped bottom plate member that fits in one end portion of that cylinder member, and a snap ring, has a plurality of long positioning protrusions provided on an inner peripheral surface of the cylinder member. By abutting the disc-shaped bottom plate member against end surfaces of these positioning protrusions, the bottom plate member can be fit into the one end portion of the cylinder member without having to provide notches therein, which enables durability against a pulling force generated in the cylinder member when the friction apply device is applied to be maintained.

4 Claims, 4 Drawing Sheets

|  | C1 | C2 | B1 | B2 | B3 |
|---|---|---|---|---|---|
| 1st | O |  |  | O |  |
| 2nd | O |  | O |  |  |
| 3rd | O |  |  |  | O |
| 4th | O | O |  |  |  |
| 5th |  | O |  |  | O |
| 6th |  | O | O |  |  |
| Rev |  |  |  | O | O |

FRICTION APPLY DEVICE OF AN AUTOMATIC TRANSMISSION

INCORPORATION BY REFERENCE

The disclosure of Japanese Patent Application No. 2005-228691 filed on Aug. 5, 2005, including the specification, drawings and abstract is incorporated herein by reference in its entirety.

BACKGROUND OF THE INVENTION

1. Field of the Invention

The invention relates to a friction apply device of a vehicular automatic transmission. More particularly, the invention relates to the structure of a clutch piston which constitutes a friction apply device.

2. Description of the Related Art

One vehicular automatic transmission includes a bottomed cylindrical clutch piston as a clutch piston that applies pressure to a friction apply element that includes a plurality of friction plates when a clutch and brake provided in the automatic transmission are applied. This clutch piston is known to reduce costs compared with an integrally formed clutch piston because it is formed of a plurality of members. For example, a clutch piston structure having a cylindrical bottom described in Japanese Patent Application Publication No. JP-A-9-32919 includes three members: a cylindrical cylinder member 104, a disc-shaped bottom member 105, and a snap ring 106, as shown in FIG. 6. A plurality of notches 107 are formed at intervals in the circumferential direction in one end of the cylinder member 104. Pawl-shaped portions 108 are formed in the outer peripheral edge of the bottom member 105 in positions which enables them to fit into the notches 107 in the cylinder member 104. The structure is then integrated by first fitting the pawl-shaped portions 108 of the bottom member 105 into the notches 107 in the cylinder member 104, and then fitting the snap ring 106 into an inner peripheral groove 109 formed in the inner peripheral surface of the cylinder member 104.

The inner peripheral groove 109 of the cylinder member cylinder member 104 into which the snap ring 106 fits is formed in the end portion of the bottomed cylindrical clutch piston of the foregoing structure, and results in the cylinder member 104 being thinner at that portion. When the clutch is applied, force in a direction that pulls parallel to the axial center of the cylinder member 104 is applied to this thin end portion via the snap ring 106 in the inner peripheral groove 109 so there is a need to make the end portion of the cylinder member 104 in which the notches 107 are formed comparatively stronger.

On the other hand, the bottomed cylindrical clutch piston is relatively heavy so attempts are being made to try to reduce its weight by forming it out of an aluminum alloy. When the piston is made of an aluminum alloy, however, the durability of the end portion of the cylinder member 104 in which the notches 107 are formed decreases because aluminum alloy is not as strong as steel.

SUMMARY OF THE INVENTION

In view of the foregoing problems, this invention thus provides a vehicular automatic transmission, which has a structure having sufficient strength even when a cylindrical cylinder member of a bottomed cylindrical clutch piston is made of an aluminum alloy.

One aspect of the invention relates to a friction apply device of a vehicular automatic transmission, which is provided with a bottomed cylindrical clutch piston that includes a cylindrical first member in which both ends are open; a disc-shaped second member that fits into one end portion of the first member; and a snap ring which fits into an inner peripheral groove formed in an inner peripheral surface of the one end portion of the first member and prevents the second member from moving in one axial direction. A plurality of positioning protrusions which extend parallel in the axial direction of the first member are formed on the inner peripheral surface of the first member. The second member abuts against end surfaces of the plurality of positioning protrusions which prevents it from moving in the other axial direction.

Accordingly, although the inner peripheral groove into which the snap ring fits is formed in the cylindrical first member, providing the positioning protrusions obviates the need to provide notches like those in the clutch piston described in the foregoing Japanese Patent Application. As a result, when the clutch is applied, the pulling force generated in the first member can be received by the entire end portion continuing in the circumferential direction of the first member, thus improving the durability of the first member.

Here, the first member may be formed of an aluminum alloy. Accordingly, even if the first member is made of an aluminum alloy which is comparatively not as strong as steel, the durability of the first member can be still maintained. Also, aluminum alloy is lighter than steel so the weight of the automatic transmission can be reduced.

Also, the first member may be formed by forging. Forming the first member by forging makes it relatively easy to machine the positioning protrusions and the like formed on the first member which keeps manufacturing costs down, thus making the vehicular automatic transmission practical.

Further, a projecting portion that projects toward an inner peripheral side, as well as a pressure applying protrusion which protrudes from that projecting portion toward the one end portion of the first member and applies pressure to a friction apply element may be formed on the other end portion of the first member. Accordingly, this pressure applying protrusion pushes against the friction apply device of the vehicular automatic transmission, so the clutch can still be applied even if an oil chamber for applying thrust to the clutch piston is relatively far away from the friction apply element in the axial direction.

Also, the first member includes a main body portion and the one end portion that has the inner peripheral groove, the one end portion of the first member may have a thick portion which protrudes annularly toward the outer peripheral side from the main body portion, and the inner peripheral groove may have a depth that substantially reaches a point corresponding to the outer peripheral surface of the main body portion of the first member. Accordingly, this thick portion increases the strength of the one end portion of the first member, thus further improving the durability against a pulling force that is generated when the clutch is applied.

Further, the friction apply device may also be provided with a clutch drum which holds an annular friction plate such that the annular friction plate is able to move in the axial direction but unable to rotate relative to the clutch piston and has a plurality of grooves formed parallel to an axial center in an outer peripheral surface thereof, the axial center being the same as the axial center of the clutch piston. Also, the plurality of positioning protrusions may fit in the grooves. Accordingly, fitting the plurality of positioning protrusions of the clutch piston into the grooves in the clutch drum forces the clutch piston and the clutch drum to rotate together, thus enabling the automatic transmission to be smaller in the radial direction.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Hereinafter, example embodiments of the invention will be described in detail with reference to the accompanying drawings.

Figures 1, 2:
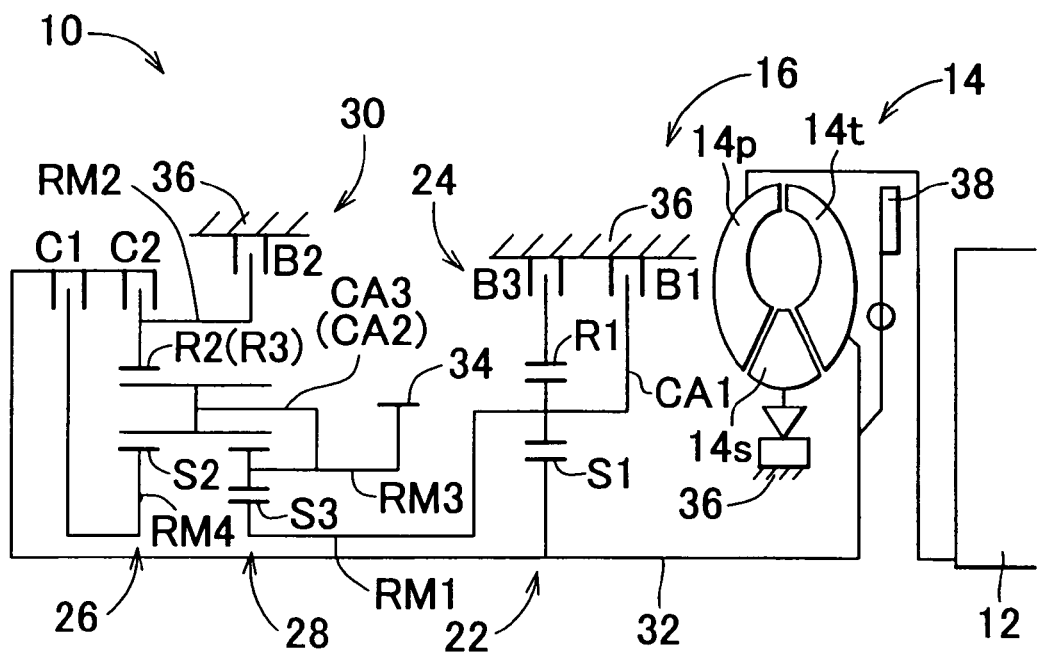
FIG. 1 is a skeleton view of a vehicular automatic transmission according to one example embodiment of the invention.
FIG. 2 is a clutch and brake application chart showing various application and release combinations of clutches and brakes to achieve specific speeds in the vehicular automatic transmission shown in FIG. 1.

FIG. 1 is a skeleton view of a vehicular drive apparatus 10 according to one example embodiment of the invention. The vehicular drive apparatus 10 is preferably employed in a FF (front-engine, front-drive) vehicle and includes an engine 12 as the driving power source for running. Output from the engine 12, which is an internal combustion engine, is transmitted to left and right driven wheels via a torque converter 14 which functions as a fluid power transmitting device, an automatic transmission 16, a differential gear unit, not shown, and a pair of axles, and the like.

The torque converter 14 is designed to transmit power via fluid and includes a pump impeller 14p fixed to a crankshaft of the engine 12, a turbine impeller 14t connected to an input shaft 32 of the automatic transmission 16, and a stator impeller 14s connected to a housing case 36 via a one-way clutch. Also, a lockup clutch 38 is provided between the pump impeller 14p and the turbine impeller 14t. When this lockup clutch 38 is engaged, the pump impeller 14p and the turbine impeller 14t are made to rotate together as a single unit.

The automatic transmission 16 includes a first transmitting portion 24 and a second transmitting portion 30 on the same axis. The first transmitting portion 24 mainly includes a single pinion type first planetary gear set 22, while the second transmitting portion 30 mainly includes a single pinion type second planetary gear set 26 and a double pinion type third planetary gear set 28. The automatic transmission 16 uses these first and second transmitting portions 24 and 30 to appropriately change the rate and/or direction of rotation that is input from the input shaft 32 and outputs the changed rotation from the output gear 34. The input shaft 32 corresponds to an input member and is a turbine shaft that rotates together with the turbine impeller 14t of the torque converter 14. The output gear 34 corresponds to an output member and is engaged either via a countershaft or directly with the differential gear unit to drive the left and right driven wheels. The vehicular automatic transmission 16 and the torque converter 14 are both structured generally symmetrical with respect to a center line, so the portions of the vehicular automatic transmission 16 and the torque converter 14 that are below that center line are omitted in FIG. 1.

The first planetary gear set 22 which constitutes the first transmitting portion 24 includes three rotating elements, i.e., a sun gear S1, a carrier CA1, and a ring gear R1. The sun gear S1 is coupled to the input shaft 32 and so is rotatably driven thereby, while the ring gear R1 is selectively connected via a third brake B3 to the housing case 36 which is a non-rotating member. Accordingly, the carrier CA1 acts as an intermediate member and outputs rotation of a slower speed than the input shaft 32. Further, four rotating elements RM1 to RM4 are formed by portions of the second planetary gear set 26 and the third planetary gear set 28, which together constitute the second transmitting portion 30, that are connected together. More specifically, a sun gear S3 of the third planetary gear set 28 forms the first rotating element RM1. A ring gear R2 of the second planetary gear set 26 and a ring gear R3 of the third planetary gear set 28 are connected together and form the second rotating element RM2. A carrier CA2 of the second planetary gear set 26 and a carrier CA3 of the third planetary gear set 28 are connected together and form the third rotating element RM3, and a sun gear S2 of the second planetary gear set 26 forms the fourth rotating element RM4. The second planetary gear set 26 and the third planetary gear set 28 are structured such that the carrier CA2 and the carrier CA3 are common members, and the ring gear R2 and the ring gear R3 are common members. Also, the second planetary gear set 26 and the third planetary gear set 28 together form a Ravigneaux type planetary gear train in which the pinion gear of the second planetary gear set 26 also serves as the pinion gear of the third planetary gear set 28.

The first rotating element RM1 (sun gear S3) is selectively connected to the housing case 36 by a first brake B1 so as to be prevented from rotating. Similarly, the second rotating element RM2 (ring gears R2 and R3) are selectively connected to the housing case 36 by a second brake B2 so as to be prevented from rotating. Further, the fourth rotating element RM4 (sun gear S2) is selectively connected to the input shaft 32 via a first clutch C1, while the second rotating element RM2 (ring gears R2 and R3) are selectively connected to the input shaft 32 via a second clutch C2. The first rotating element RM1 (sun gear S3) is selectively connected to the carrier CA1 of the first planetary gear set 22 which serves as the intermediate output member. The third rotating element RM3 (carriers CA2 and CA3) are integrally connected with the output gear 34. These connections result in the various rotating elements RM1 to RM4 outputting rotation. The first brake B1 to the third brake B3 and the first clutch C1 and the second clutch C2 are all multiple-disc hydraulic friction apply devices which apply friction by means of a hydraulic cylinder. Various speeds including six forwards speeds and one reverse speed can be established by switching the apply/release state of these brakes and clutches.

The clutch and brake application chart shown in FIG. 2 shows the relationship between the application state of the clutches and brakes and the various speeds, with a circle indicating application. In the vehicular automatic transmission 16 according to this example embodiment, a multi-speed transmission of six forward speeds is achieved by applying any two of the two clutches C1 and C2 and the three brakes B1 to B3.

Figure 3:
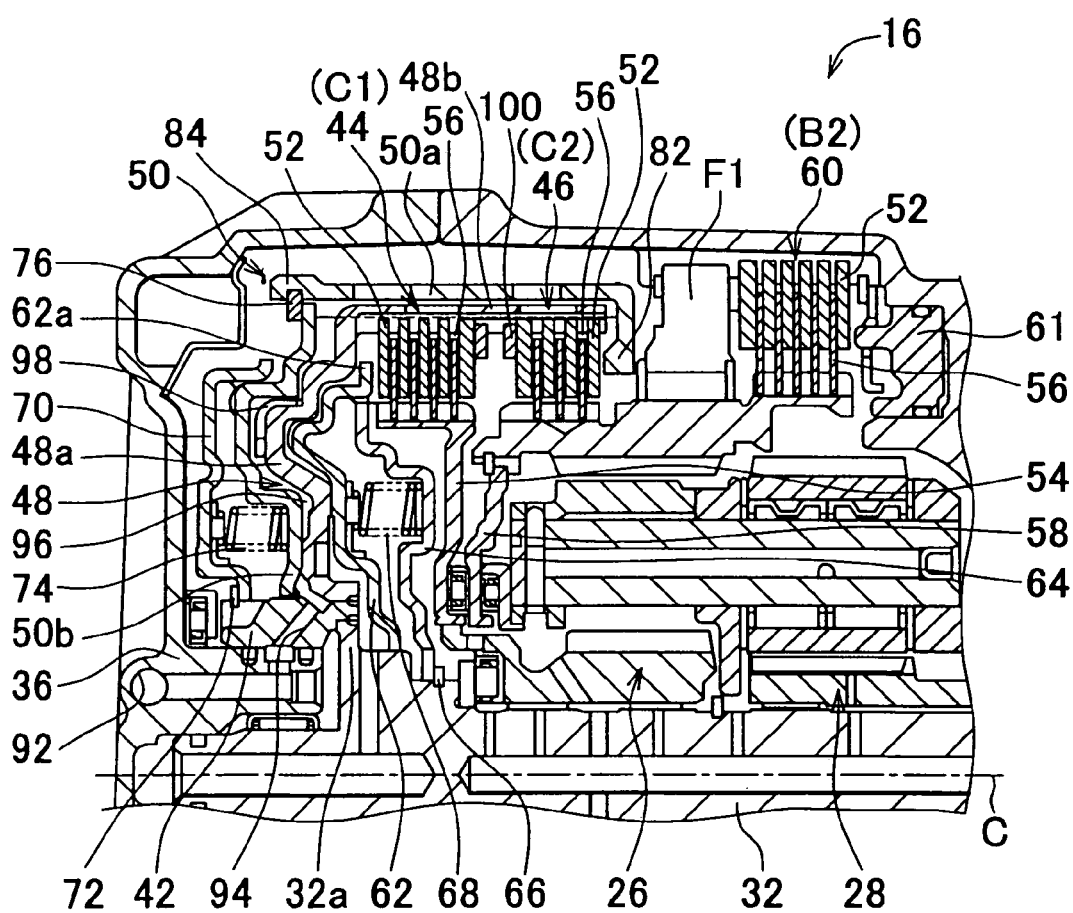
FIG. 3 is a sectional view showing in detail the main portions inside of the vehicular automatic transmission.

FIG. 3 is a sectional view showing in detail the main portions of the second transmitting portion 30 of the automatic transmission 16. The second transmitting portion 30 is generally symmetrical with respect to the axial center C so the lower half thereof is omitted in the drawing. The automatic transmission 16 includes an input shaft 32, the single pinion type second planetary gear set 26 and the double pinion type third planetary gear set 28, the first clutch C1 and the second clutch C2, and the second brake B2 and a one-way clutch F1. The input shaft 32 is supported by, and so as to be able to rotate relative to, the housing case 36 via a bearing within the housing case 36. The single pinion type second planetary gear set 26 and the double pinion type third planetary gear set 28 are relatively rotatably supported via a plurality of bushes on the outside in the radial direction of the input shaft 32. The first clutch C1 and the second clutch C2 are arranged between the input shaft 32 and the second planetary gear set 26 and selectively transmit the rotation of the input shaft 32 to the second planetary gear set 26 and the third planetary gear set 28. The one-way clutch F1 and the second brake B2 are arranged on the outside in the radial direction of the second planetary gear set 26 and the third planetary gear set 28. The one-way clutch F1 prevents rotation of the ring gear R2 of the second planetary gear set 26 and the ring gear R3 of the third planetary gear set 28 in one direction, and the second brake B2 selectively holds the ring gear R2 of the second planetary gear set 26 and the ring gear R3 of the third planetary gear set 28 against rotation.

A flange portion 32a which extends vertically with respect to the axial center C is formed on the input shaft 32. An annular base member 42, which is relatively rotatably supported with respect to the housing case 36, is integrally joined by welding to the outer peripheral edge of this flange portion 32a, and a clutch drum 48 is integrally joined by welding to the outer peripheral surface of the base member 42 on the side near the second planetary gear set 26. This clutch drum 48 supports a first friction apply element 44 which is a structural member of the first clutch C1, as well as a second friction apply element 46 which is a structural member of the second clutch C2. A second clutch piston 50 is fitted, via a seal, onto the outer peripheral surface of the base member 42 so as to cover the clutch drum 48.

The clutch drum 48 is a bottomed cylindrical member in which one end is open in the axial direction. The clutch drum 48 is formed of a generally disc-shaped bottom portion 48a, in which the inner peripheral edge is joined by welding to the outer peripheral surface of the base member 42, and a cylindrical cylinder portion 48b that is connected to the outer peripheral edge of that bottom portion 48a.

Long spline teeth are formed on the inner peripheral surface of the cylinder portion 48b. A plurality of friction plates 52 of the first friction apply element 44 that forms the first clutch C1 are spline-fitted on the bottom portion 48a side of the cylinder portion 48b, while a plurality of friction plates 52 of the second friction apply element 46 that forms the second clutch C2 are spline-fitted to the open side of the cylinder portion 48b.

The first friction apply element 44 includes the friction plates 52 that are spline-fitted to the cylinder portion 48b, and a plurality of other friction plates 56 that are interposed between those friction plates 52 and spline-fitted to the outer peripheral surface of a first clutch hub 54 which transmits rotation to the ring gear R2 of the second planetary gear set 26.

Meanwhile, the second friction apply element 46 includes the friction plates 52 which are spline-fitted to the cylinder portion 48b, and a plurality of other friction plates 56 which are interposed between those friction plates 52 and spline-fitted to the outer peripheral surface of a second clutch hub 58 that transmits rotation to the ring gears R2 and R3 of the second planetary gear set 26 and the third planetary gear set 28. Also, the one-way clutch F1 is connected to the outer peripheral surface of the second clutch hub 58, and the friction plates 56 of a third friction apply element 60, which is a structural member of the second brake B2, is spline-fitted to the outer peripheral surface of the second clutch hub 58.

The third friction apply element 60 includes a plurality of the friction plates 56 which are spline-fitted to the outer peripheral surface of the second clutch hub 58, and a plurality of other friction plates 52 which are interposed between those friction plates 56 and spline-fitted to the housing case 36. The second brake B2 is applied by applying pressure to the third friction apply element 60 with a brake piston 61 which is positioned on the opposite side of the third friction apply element 60 from the one-way clutch F1 and is slidably fitted in the housing case 36.

A first clutch piston 62 for applying pressure to the first friction apply element 44, and a spring receiving plate 64 are arranged between the clutch drum 48 and the first clutch hub 54. The inner peripheral surface of the first clutch piston 62 is fitted via a seal to the input shaft 32 so as to be able to slide with respect thereto in the axial direction. The outer surface of the first clutch piston 62 includes a pressure applying portion 62a that extends in the direction of the first friction apply element 44. The spring receiving plate 64 is fitted to the input shaft 32 and retained by a snap ring 66 so as not to be able to move in the axial direction. Also, a return spring 68 which urges the first clutch piston 62 to move toward the clutch drum 48 side is interposed between the first clutch piston 62 and the spring receiving plate 64.

A spring receiving plate 70 is fitted to the outer peripheral surface of the base member 42 and retained by a snap ring 72 so as not to be able to slide in the axial direction, on the other side of the clutch drum 48 from the second clutch piston 50. A return spring 74 which urges the second clutch piston 50 to move toward the bottom portion 48a of the clutch drum 48 is interposed between the second clutch piston 50 and the spring receiving plate 70.

The second clutch piston 50 can be regarded as the clutch piston of the invention. This second clutch piston 50 includes a cylindrical cylinder member 50a that is open at both ends, a disc-shaped bottom plate member 50b that is fitted in one end portion of the cylinder member 50a, and a snap ring 76. In this example embodiment, the cylinder member 50a and the bottom plate member 50b can be regarded as a first member and a second member, respectively.

Figure 4:
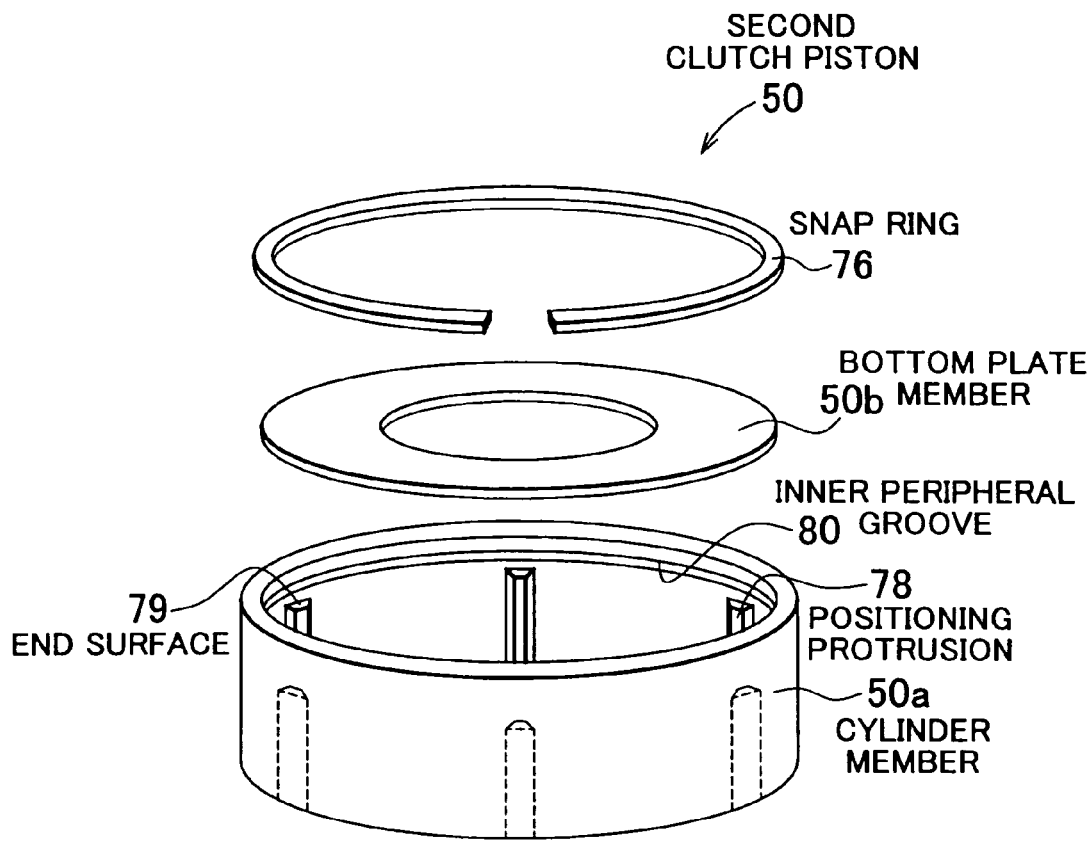
FIG. 4 is a block diagram showing a clutch piston according to the example embodiment.

FIG. 4 is a simplified schematic showing the basic structure of the second clutch piston 50. A plurality of long positioning protrusions 78 which extend parallel to the axial direction of the cylinder member 50a are formed at equiangular intervals on the inner peripheral surface of the cylinder member 50a. An end surface 79 of each positioning protrusion 78 on the side into which the bottom plate member 50b is fitted has a generally rectangular flat shape. The end surfaces 79 of the positioning protrusions 78 are each in the same position in the axial direction such that the bottom plate member 50b is fixed vertically with respect to the axial center of the cylinder member 50a with the surface on one side of the bottom plate member 50b abutting against the end surfaces 79 of the positioning protrusions 78. Also, an inner peripheral groove 80 into which the snap ring 76 is fit is formed a predetermined distance, which is equal to the thickness of the disc-shaped bottom plate member 50b, above the end surfaces 79 of the positioning protrusions 78.

Accordingly, the bottom plate member 50*b* is fixed in place by having one side thereof abut against the end surfaces 79 of the positioning protrusions 78 of the cylinder member 50*a*, and the snap ring 76 then fitted into the inner peripheral groove 80 on the other side of the bottom plate member 50*b*. Further, the positioning protrusions 78 also extend all the way to the other end portion of the cylinder member 50*a* and thus also act as reinforcing members for the cylinder member 50*a*.

Returning now to FIG. 3, the second clutch piston 50 is fitted via a seal to the outer peripheral surface of the base member 42. The plurality of positioning protrusions 78 formed on the cylinder member 50*a* fit into grooves 86 shown in FIG. 5, which will be described later, formed in the cylinder portion 48*b* of the clutch drum 48 such that the second clutch piston 50 rotates together with the clutch drum 48.

Figure 5:
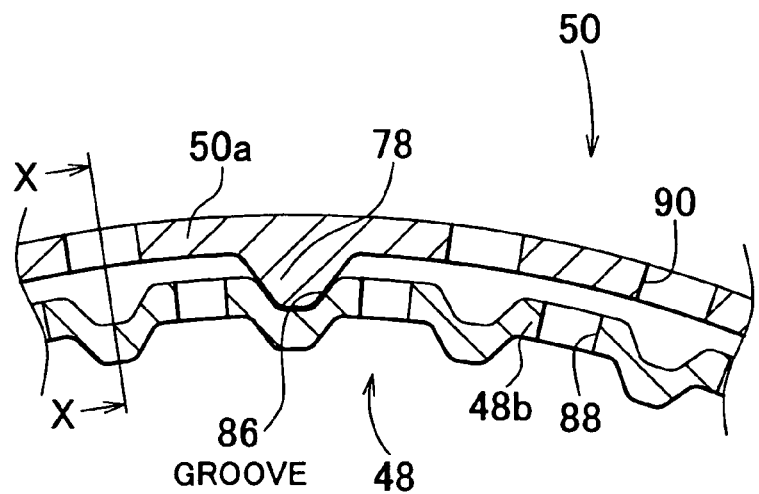
FIG. 5 is a sectional view showing the main portions of the clutch piston and a clutch drum shown in FIG. 3 cut vertically with respect to the axial center.
Figure 6:
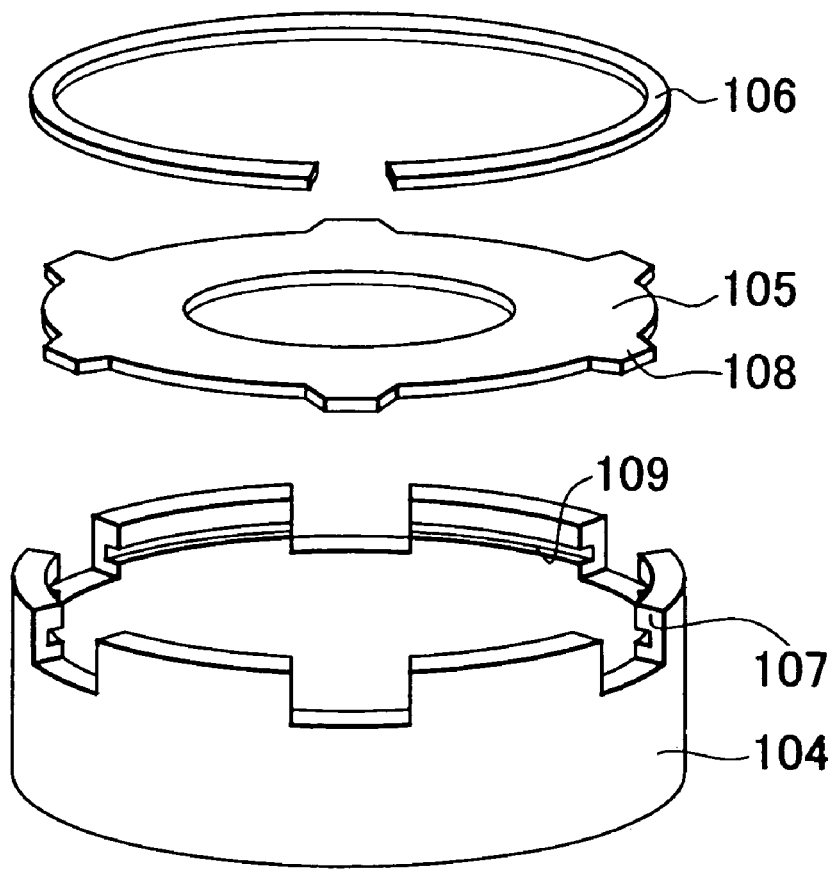
FIG. 6 is a block diagram showing a clutch piston that includes a plurality of members according to related art.

FIG. 5 is a sectional view showing the main portions of the second clutch piston 50 and the clutch drum 48 cut vertically with respect to the axial center C. The sectional view as viewed from the direction of arrow X in FIG. 5 corresponds to FIG. 3. As shown in FIG. 5, the positioning protrusions 78 of the cylinder member 50*a* fit slidably in the axial direction into the long grooves 86 formed in the outer peripheral surface of the cylinder portion 48*b* of the clutch drum 48. Thus, the second clutch piston 50 is supported by the clutch drum 48 so as not to be able to rotate relative thereto. An oil hole 90 formed in the second clutch piston 50 and an oil hole 88 formed in the clutch drum 48 serve as oil paths for discharging lubricating oil that has lubricated the first friction apply element 44 and the second friction apply element 46.

Also as shown in FIG. 3, on the other end portion of the second clutch piston 50, i.e., on the end portion of the second clutch piston 50 that pushes against the second friction apply element 46, a projecting portion is formed which projects radially inward toward the axial center from the inner peripheral side of that other end portion. Further, an annular pressure applying protrusion 82 is formed protruding toward the one end portion of the cylinder member 50*a* (i.e., toward the second friction apply element 46) from the inner peripheral edge of that projecting portion.

Also, a thick portion 84 which protrudes annularly toward the outer peripheral side from the main body portion of the cylinder member 50*a* is formed on the one end portion of the cylinder member 50*a* which has the inner peripheral groove 80 into which the snap ring 76 fits. The thick portion 84 enables the depth of the inner peripheral groove 80 reaches close to a point corresponding to the outer peripheral surface of the main body portion of the cylinder member 50*a*.

The cylinder member 50*a* is made of an aluminum alloy and is formed by forging, i.e., by an aluminum die-cast. Accordingly, the relatively complex shapes of the pressure applying protrusion 82, the thick portion 84, and the positioning protrusions 78 and the like which are formed on the cylinder member 50*a* can also be obtained all at once with a die, which makes it possible to form them relatively easily compared with processing methods such as press forming and cutting.

In the hydraulic friction apply device structured in this way, when hydraulic fluid is supplied from a hydraulic fluid supply passage 92 in the housing case 36, that hydraulic fluid passes through a hydraulic fluid supply hole 94 formed in the base portion 42 and is supplied to an oil chamber 96 formed between the second clutch piston 50 and the clutch drum 48. This oil chamber 96 is made oil tight by a seal member 98 such that as hydraulic fluid is supplied, the second clutch piston 50 is pushed toward the return spring 74 side by the hydraulic pressure from that hydraulic fluid. As this second clutch piston 50 advances, the pressure applying protrusion 82 of the second clutch piston 50 applies pressure to the second friction apply element 46. On the opposite side of the second friction apply element 46 from the pressure applying protrusion 82, a snap ring 100 which prevents the friction plates 52 and 56 of the second friction apply element 46 from moving is fitted to the inner peripheral surface of the cylinder portion 48*b*. The second friction apply element 46 is then applied as the friction plates 52 and 56 of the second friction apply element 46 are squeezed by the pressure applying protrusion 82 against this snap ring 100.

When pressure is applied to this second friction apply element 46, the bottom plate portion 50*b* of the second clutch piston 50 pushes against the snap ring 76 in the direction away from the pressure applying protrusion 82 parallel with the axial center C. As a result, force is generated by the snap ring in the direction that pulls at both end portions of the cylinder member 50*a*. Pulling stress from this pulling force also increases at the outer periphery of the inner peripheral groove 80 in the cylinder member 50*a* because the cylinder member 50*a* is usually thinner there, which is problematic from the viewpoint of durability. In this example embodiment, however, that force can be received by the entire body in the circumferential direction because there are no notches in the cylinder member 50*a* as there are in the related art. Furthermore, the cylinder member 50*a* is reinforced by the thick portion 84 formed at the one end portion thereof. As a result, according to this example embodiment, durability can be maintained even if the cylinder member 50*a* is made of an aluminum alloy that is not as strong as steel.

As described above, in this example embodiment, the second clutch piston 50 is formed of a plurality of members including the cylindrical cylinder member 50*a* in which both ends are open, the disc-shaped bottom plate member 50*b* that fits into one end portion of the cylinder member 50*a*, and a snap ring 76. By forming a plurality of long positioning protrusions 78 on the inner peripheral surface of the cylinder member 50*a* and abutting the disc-shaped bottom plate member 50*b* against the end surfaces 79 of these positioning protrusions 78, the bottom plate member 50*b* can be fit into the one end portion of the cylinder member 50*a* without having to provide notches therein, which enables the entire end portion that continues in the circumferential direction of the cylinder member 50*a* to receive the pulling force that is generated in the cylinder member 50*a* when the friction apply device is applied. As a result, durability of the cylinder member 50*a* is increased.

Also according to this example embodiment, the cylinder member 50*a* is formed of an aluminum alloy which enables the second clutch piston 50 to be lighter. Also, even though aluminum alloy is not as strong as steel, the structure of the second clutch piston 50 described above enables it to be strong enough to be used without a problem.

Further, according to the example embodiment, the relatively complex shapes of the thick portion 84, the pressure applying protrusion 82, and the positioning protrusions 78 and the like which are formed on the cylinder member 50*a* can also all be obtained at once with a die by forging, which makes it possible to form them relatively easily compared with other processing methods such as press forming and cutting.

Also according to the example embodiment, the pressure applying protrusion 82 which protrudes in the axial direction toward the one end portion of the cylinder member 50*a* (i.e., toward the second friction apply element 46) from the inner peripheral edge of the projecting portion that projects from the inner peripheral side of the cylinder member 50*a* pushes against the second friction apply element 46 at the other end portion of the cylinder member 50a. Therefore, even if the oil chamber 96 for applying thrust to the second clutch piston 50 is relatively far away from the friction apply element 46 in the axial direction, the clutch can still be applied.

Also according to this example embodiment, the thick portion 84 that protrudes annularly toward the outer peripheral side from the main body portion of the cylinder member 50a is provided on the one end portion of the cylinder member 50a, and the inner peripheral groove 80 formed in the one end portion has a depth that substantially reaches a point corresponding to the outer peripheral surface of the main body portion of the cylinder member 50a. Therefore, the strength of the one end portion of the cylinder member 50a is increased which improves durability with respect to the pulling force that is generated when the clutch is applied. The inner peripheral groove 80 can also be made relatively deep, which makes it possible to prevent the snap ring 76 from falling out.

Also according to the example embodiment, the second clutch piston 50 and the clutch drum 48 are made to rotate together by the positioning protrusions 78 of the second clutch piston 50 being fit into the long grooves 86 in the clutch drum 48. As a result, the automatic transmission can be made smaller in the radial direction.

Although the specific example embodiments of the invention have been described herein with reference to the drawings, the invention may also be implemented with the following modifications.

For example, in the foregoing example embodiment, the positioning protrusions 78 extend all the way to the other end portion of the cylinder member 50a in order to reinforce the second clutch piston 50. Alternatively, however, the positioning protrusions 78 may also be shortened in the axial direction in order to reduce weight.

Also in the foregoing example embodiment, the cylinder member 50a is formed of an aluminum alloy. Alternatively, however, it may also be formed of another metal such as steel or the like.

Further in the foregoing example embodiment, the cylinder member 50a is manufactured by forging. Alternatively, however, it may also be manufactured by a method other than forging, such as press forming or cutting.

Also in the foregoing example embodiment, the thick portion 84 is formed on the one end portion side of the cylinder member 50a. The cylinder member 50a may also be used, however, without having this thick portion 84.

Also in the foregoing example embodiment, a plurality of the positioning protrusions 78 of the cylinder member 50a are arranged at equiangular intervals. It is not particularly necessary, however, to arrange them at equiangular intervals. Further, the shape of the positioning protrusions 78 can be freely changed, e.g., the positioning protrusions 78 can be formed continuous around the circumference.

Although the invention has been described herein with reference to specific embodiments, many modifications and variations therein will readily occur to those skilled in the art. Accordingly, all such modifications and variations are included within the intended scope of the invention.

What is claimed is:

1. A friction apply device of a vehicular automatic transmission, comprising:
    a bottomed cylindrical clutch piston which includes:
        a first member, which is a cylindrical member in which both ends are open, having a plurality of positioning protrusions that extend in an axial direction formed on an inner peripheral surface thereof, and an inner peripheral groove formed in an inner peripheral surface of one end portion;
        a second member which is a disc-shaped member that fits into the one end portion of the first member and abuts against end surfaces of the plurality of positioning protrusions such that the second member is prevented from moving in one axial direction; and
        a snap ring which fits in the inner peripheral groove and prevents the second member from moving in the other axial direction,
        wherein a projecting portion that projects toward an inner peripheral side, as well as a pressure applying protrusion which protrudes from the projecting portion toward the one end portion of the first member and applies pressure to a friction apply element are formed on the other end portion of the first member; and
    a clutch drum which holds an annular friction plate such that the annular friction plate is able to move in the axial direction but unable to rotate relative to the clutch piston and has a plurality of grooves formed parallel to an axial center in an outer peripheral surface thereof, the axial center being the same as the axial center of the clutch piston,
    wherein the plurality of positioning protrusions fit in the grooves.

2. The friction apply device according to claim 1, wherein the first member is formed of an aluminum alloy.

3. The friction apply device according to claim 1, wherein the first member includes a main body portion and the one end portion that has the inner peripheral groove, the one end portion of the first member has a thick portion which protrudes annularly toward the outer peripheral side from the main body portion, and the inner peripheral groove has a depth that substantially reaches a point corresponding to the outer peripheral surface of the main body portion of the first member.

4. A friction apply device of a vehicular automatic transmission, comprising:
    a bottomed cylindrical clutch piston which includes:
        a first member, which is a cylindrical member in which both ends are open, having a plurality of positioning protrusions that extend in an axial direction formed on an inner peripheral surface thereof, and an inner peripheral groove formed in an inner peripheral surface of one end portion;
        a second member which is a disc-shaped member that fits into the one end portion of the first member and abuts against end surfaces of the plurality of positioning protrusions such that the second member is prevented from moving in one axial direction; and
        a snap ring which fits in the inner peripheral groove and prevents the second member from moving in the other axial direction,
    a clutch drum which holds an annular friction plate such that the annular friction plate is able to move in the axial direction but unable to rotate relative to the clutch piston and has a plurality of grooves formed parallel to an axial center in an outer peripheral surface thereof, the axial center being the same as the axial center of the clutch piston,
    wherein the plurality of positioning protrusions fit in the grooves.

* * * * *